United States Patent
Wheaton, III et al.

[15] 3,706,517
[45] Dec. 19, 1972

[54] TURRET INDEXING MEANS

[72] Inventors: Theodore C. Wheaton, III, Ocean City; Walter Panas, Millville, both of N.J.

[73] Assignee: Wheaton Industries, Millville, N.J.

[22] Filed: Jan. 6, 1971

[21] Appl. No.: 104,359

[52] U.S. Cl.................425/324 B, 425/342, 425/348
[51] Int. Cl. ..............................................B29d 23/03
[58] Field of Search......18/5 BB, 5 BJ, 2 D, 2 B, 2 C, 18/2 G, 2 H; 425/324 B, 342, 348

[56] References Cited

UNITED STATES PATENTS

| | | | |
|---|---|---|---|
| 3,100,913 | 8/1963 | DeMatteo | 18/5 BJ X |
| 2,853,736 | 9/1958 | Gussoni | 18/5 BJ UX |
| 3,070,843 | 1/1963 | Jurgeleit | 18/20 H |
| 3,584,337 | 1/1971 | Aoki | 18/5 BJ |

Primary Examiner—H. A. Kilby, Jr.
Attorney—Paul & Paul

[57] ABSTRACT

A reliable, rapid turret indexing means having particularly desirable decelerative characteristics, which means is easily combined with simple turret engagement and disengagement movements, and which means is especially adapted for transferring radially disposed core rods between work stations in an injection blow molding machine. This indexing means comprises a crank arm pivotally mounted for movement about the turret axis between first and second limit positions and connected to the driving end of a linear link member the other end of which is driven through a linear path parallel to the crank arm at the second of its limit positions. A driving means, preferably a hydraulic cylinder, is also provided to exert compressive force on the linear link member to propel the crank arm from its first limit position toward its second limit position and to return the crank arm to its first position.

11 Claims, 8 Drawing Figures

INVENTORS.
Theodore C. Wheaton III
Walter Panas
BY
Paul + Paul
ATTORNEYS.

3,706,517

TURRET INDEXING MEANS

INTRODUCTION AND BACKGROUND

This invention relates to a turret indexing means characterized by relatively short total stroke time and rapid but controlled decelerative movement at the end of the indexing motion. In particular this invention relates to a turret indexing means used to transfer core rods between various radially disposed stations in injection blow molding machines.

As is well known, numerous machine designs involve the transfer of work pieces between various radially disposed work stations by means of turret upon which said work pieces are mounted. Mechanisms for moving or "indexing" such turrets through a fraction of a revolution about the turret axis for purposes of transferring work pieces between work stations are generally referred to herein as turret indexing means or mechanisms.

In many types of mass production apparatus utilizing turret mechanisms, productivity can be increased by reducing the total time required for the turret indexing stroke or movement. In certain specific applications there may be other reasons for increasing the speed of the turret indexing movement. This is particularly true in an injection blow molding machine wherein fast indexing may be desirable in order to maintain optimum melt characteristics of a parison formed at one work station of the machine while transferring it to a subsequent work station where the parison is blown into a hollow product.

Simply increasing the speed of an indexing mechanism often introduces certain difficulties however. Most notably, as the speed with which the turret and its associated apparatus is rotated about the turret axis increases, so, obviously, does its inertia. Bringing it to a stop at the conclusion of the indexing movement requires a great deal of energy absorption by mechanical members which must nevertheless ensure that the turret comes to rest at a precisely predetermined angular position. Stops in such mechanisms are often characterized by "jolts" or rapid, uncontrolled deceleration. Such mechanisms are therefore usually expensive, difficult to maintain and prone to mechanical failure.

This problem is aggravated as machine size and complexity increase by the resultant increased mass of the turret and its associated apparatus and by the relatively greater precision often required in such machines.

With a view to this problem, therefore, it is an object of the present invention to provide a turret indexing mechanism which is relatively simple, fast, and precise and which is characterized by a desirable decelerative movement at the end of the indexing movement.

A further object of this invention is to provide such a turret indexing means adapted to engage and to disengage intermittently a turret, such as that used in certain types of injection blow molding machines.

Still another object of this invention is to provide such a turret indexing mechanism which prevents damage due to attempted turret engagement when the cooperating engaging means are not aligned.

BRIEF DESCRIPTION OF THE INVENTION

These and other objects, which will become apparent in the course of the following discussion, are met by a turret indexing means having a crank arm, the inner end of which is pivotally mounted on the turret axis for movement between first and second limit positions angularly displaced less than 180°, preferably 60°–120°, from one another. The outer end of the crank arm is pivotally connected to the driving end of a linear link member. This linear link member also has a driven end reciprocably movable in a linear path. The crank arm at its second limit position is parallel to this linear path and perpendicular to the linear link member. The thrust on the driven end of the linear link member is thus transposed decreasingly less effectively into radial movement of the crank arm as the crank arm approaches its second limit position. This provides rapid movement with a timely and significant decelerative phase at the conclusion thereof.

Preferably, this indexing mechanism is used in an injection blow molding machine having three or four work stations each radially disposed with equal angular displacement from adjacent stations. Prior to each indexing movement, the turret moves along its axis toward and into engagement with the indexing mechanism. After indexing, through either 90° or 120° as the case may be, to the second limit position of the crank arm, the turret disengages and returns to its original position while the indexing means does likewise.

The actual means for engaging the turret and indexing means preferably comprises a radially disposed flag member movable circumferentially in unison with the indexing mechanism crank arm and mating slots on the turret for receiving this flag member. These slots are angularly displaced from one another by an angle corresponding to that between the first and second limit positions of the crank arm.

The flag member is preferably mounted for pivotal movement about an axis perpendicular to its planar faces. This permits the flag member to be automatically rotated out of its engagement position if engagement is attempted when the flag is not aligned with one of the mating slots and prevents damage to the apparatus.

DETAILED DESCRIPTION OF THE DRAWINGS AND PREFERRED EMBODIMENT OF THE PRESENT INVENTION

For a better understanding of the present invention, reference is made to the appended claims and to the following detailed discussion, taken in conjunction with the accompanying drawings in which:

Figure 3:
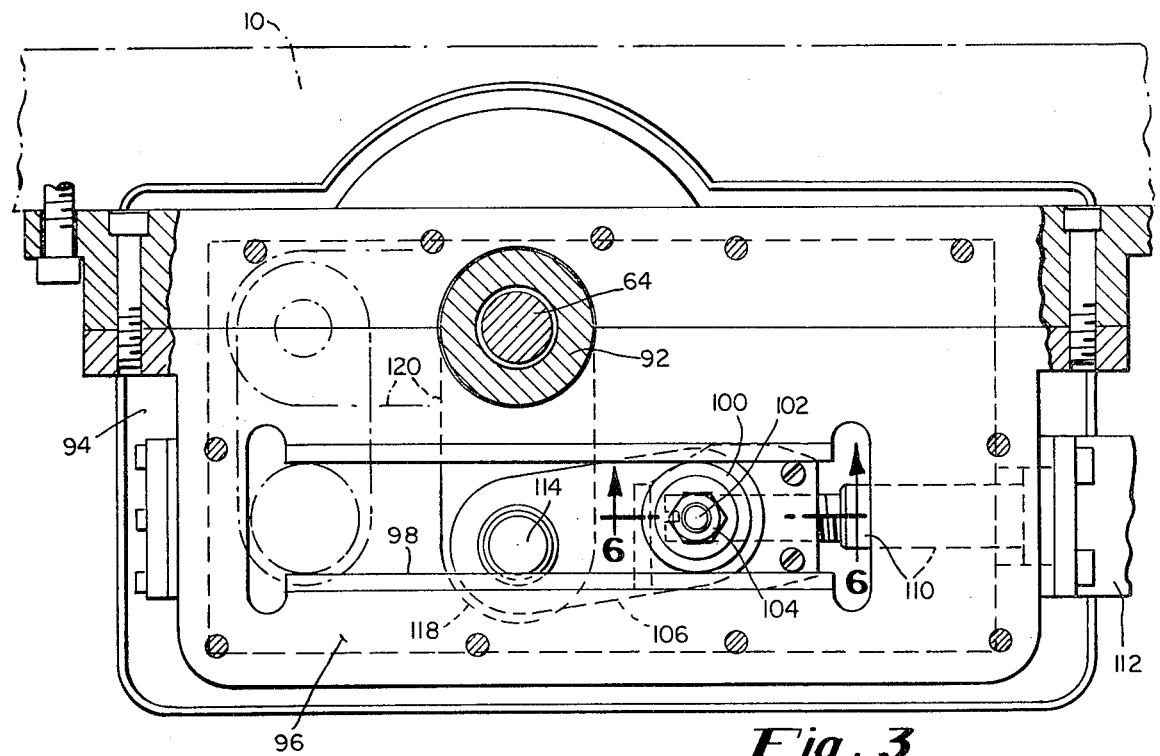
FIG. 3 is an expanded, sectional, plan view of the machine shown in FIGS. 1 and 2, taken in the plane 3—3, showing specifically and in detail the preferred embodiment of the turret indexing means of the present invention.
Figure 4:
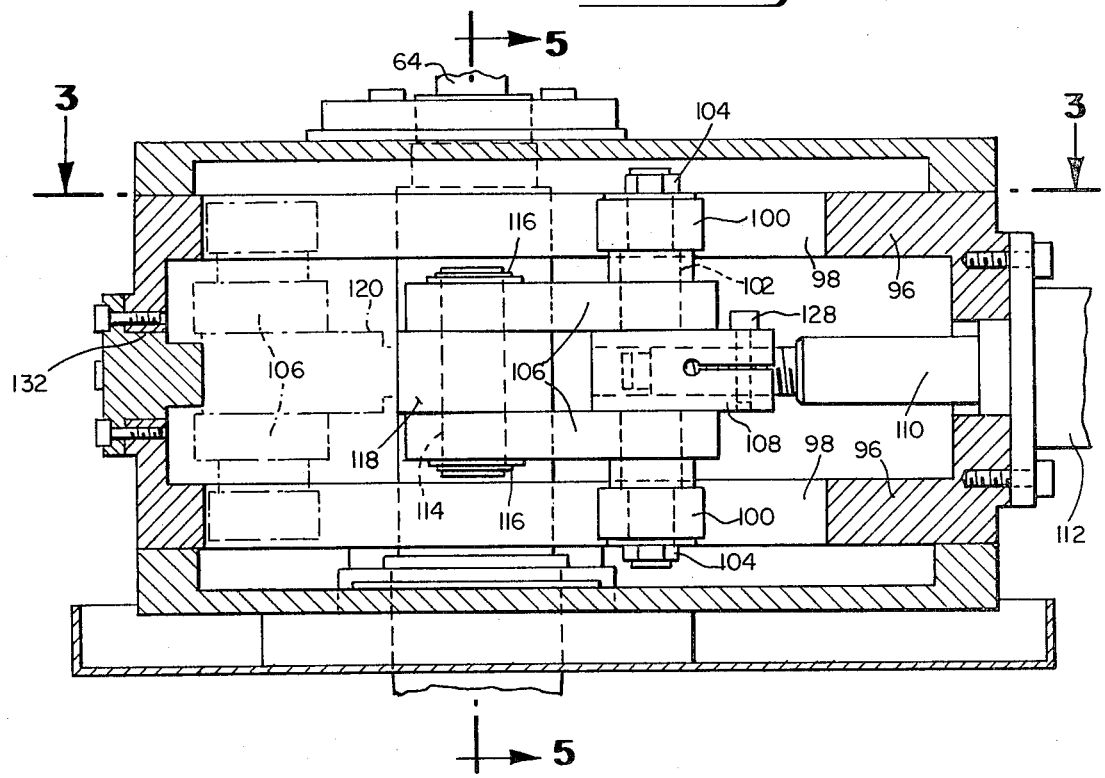
Figure 5:
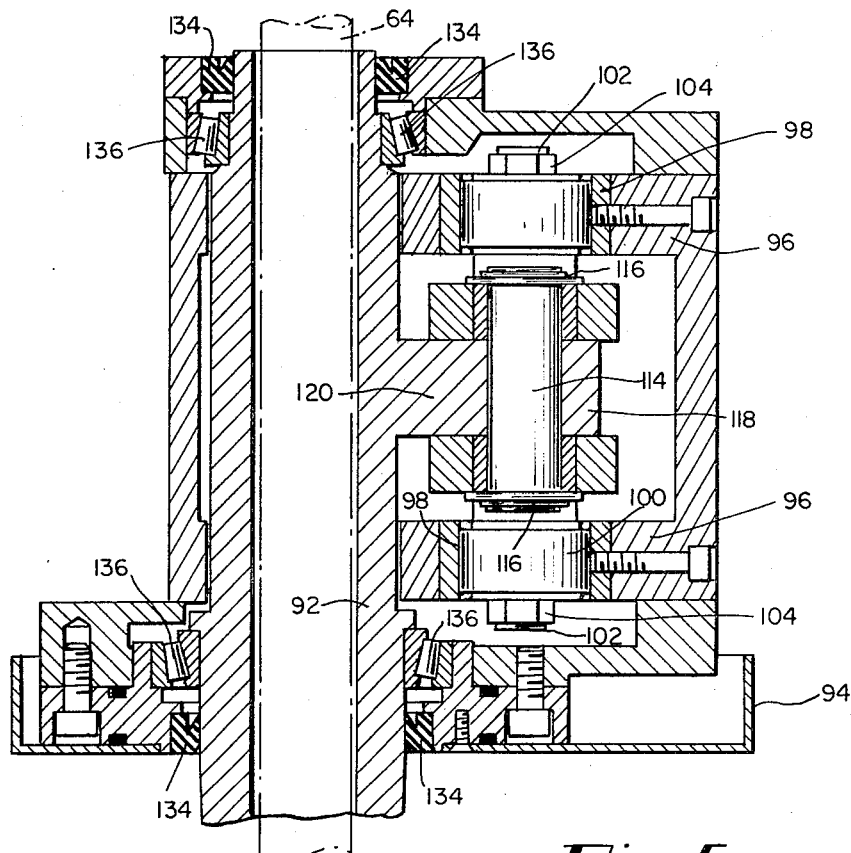
Figure 6:
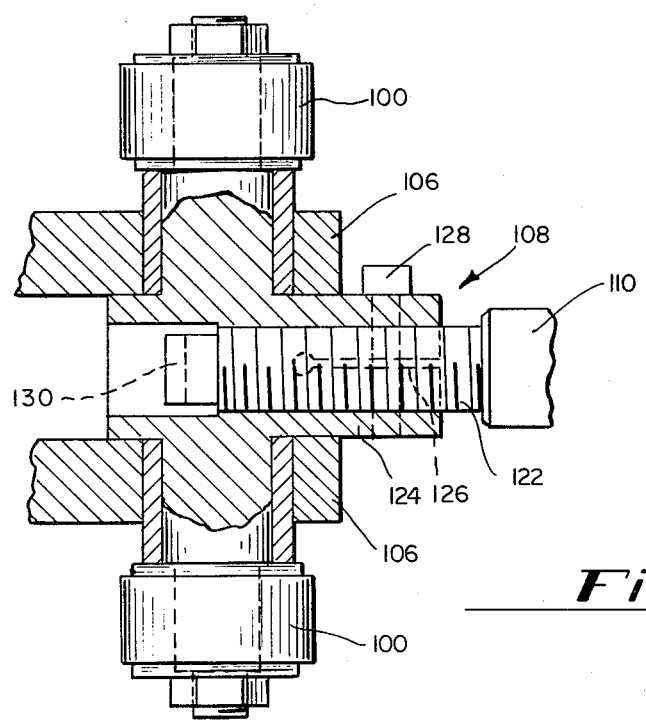
Figure 7:
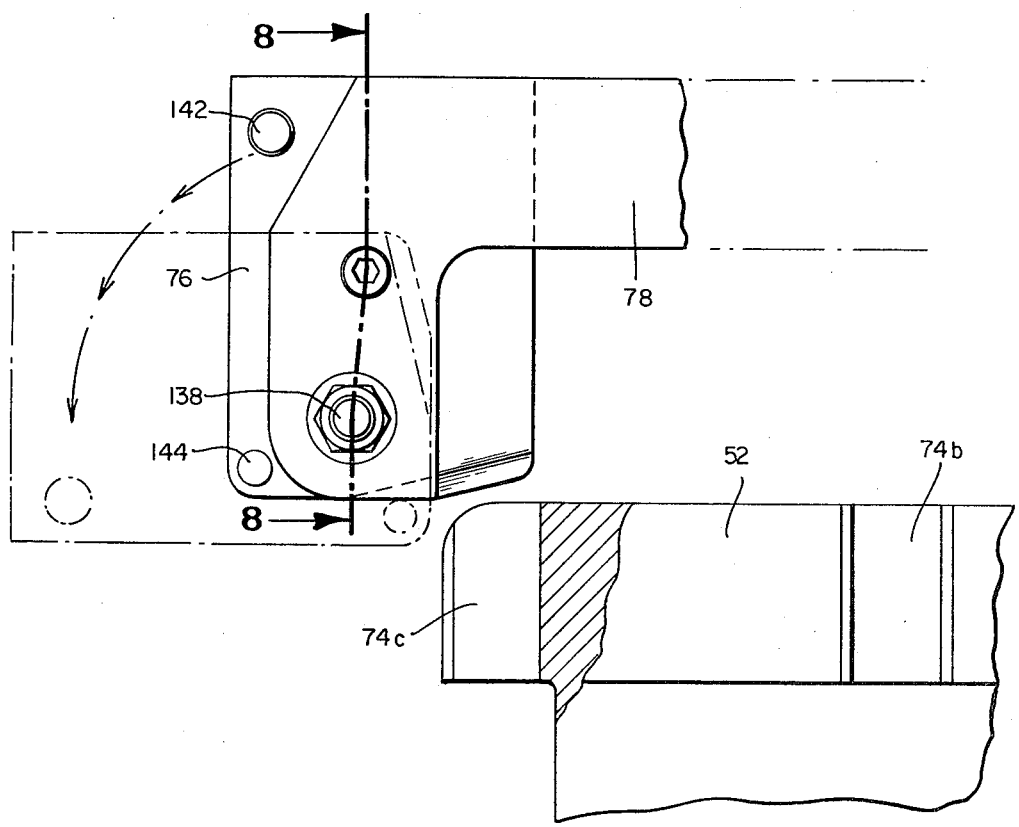
Figure 8:
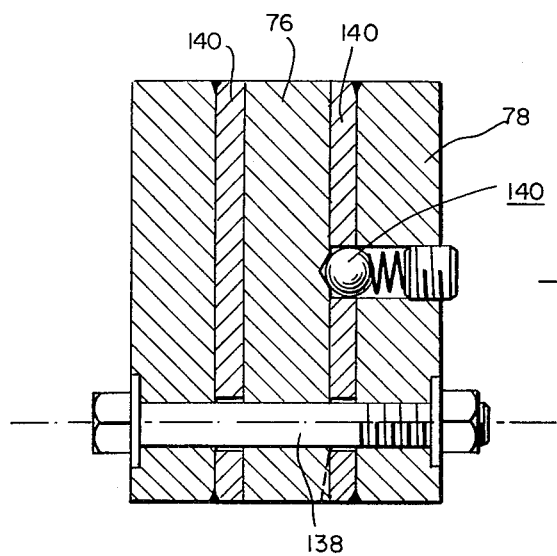

FIGS. 4 and 5 are sectional views of the turret indexing means shown in FIG. 3, taken in the planes 4—4 and 5—5, respectively;

FIG. 6 is a sectional detail view of one part of the turret indexing means shown in FIG. 3, taken in the plane 6—6;

FIG. 7 is an enlarged side view of the turret indexing means engagement mechanism of the apparatus previously illustrated; and FIG. 8 is a sectional view, in the plane 8—8 of the mechanism shown in detail in FIG. 7.

Figure 1:
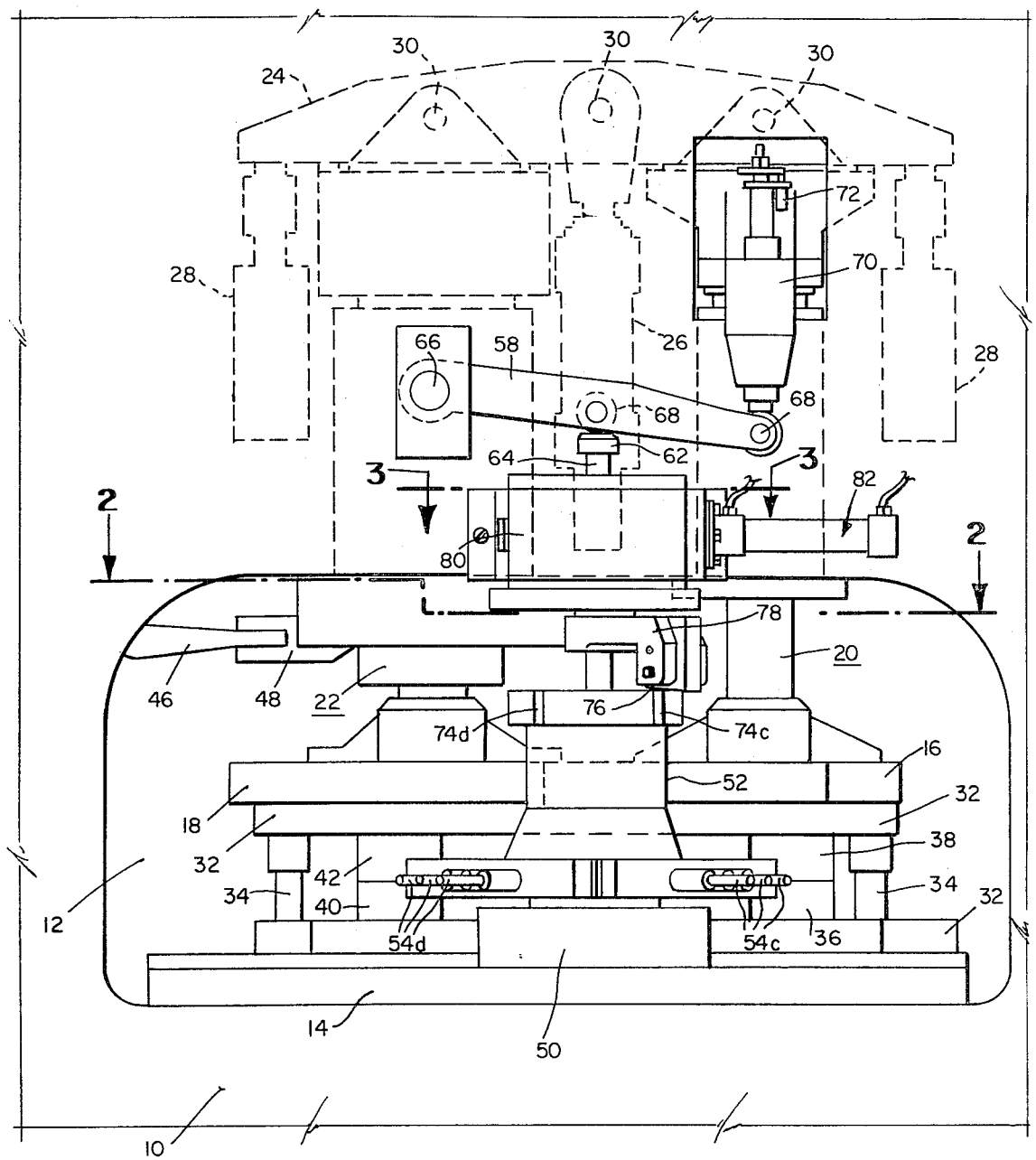
FIG. 1 is a front view of an injection blow mold machine utilizing the turret indexing mechanism of the present invention.

Referring specifically now to FIG. 1, there is shown a plate frame structure 10 having an opening 12 therein. On the lower horizontal surface of opening 12 is mounted stationary mold half base 14. Directly above base 14 is movable blow mold half mounting member 16 and movable injection mold half mounting member 18, each attached respectively through connecting means 20 and 22 to yoke member 24 movable vertically by hydraulic piston 26 counterbalanced by constant pressure pneumatic cylinders 28, all of which, except the lower portions of connecting means 20 and 22 and movable mold half mounting members 16 and 18 attached thereto, are enclosed within plate frame structure 10.

Connecting means 20 and 22 and hydraulic piston 26 are all attached by pivotal connections 30 to yoke member 24 in order to provide for any slight vertical movement of connecting means 20 and 22 and piston 26 relative to one another.

Between stationary mold half base 14 and movable mold half mounting members 16 and 18 are disposed mold positioning members 32, guide bars 34, stationary blow mold half 36, movable blow mold half 38, stationary injection mold half 40 and movable injection mold half 42.

Connecting members 46 and 48 are associated with an injection mold locking system described in more detail with reference to FIG. 2.

Other, more conventional, mold opening, closing and clamping mechanisms may also be incorporated in the injection blow molding machine of FIG. 1. For example, separate hydraulic cylinders mounted on the vertical center lines of the injection and blow molds could be used to open, to close and to apply the necessary clamping force to each of these molds.

Also seen in FIG. 1 is turret base 50, with turret positioning pins (not illustrated) thereon, and turret head 52 with four equi-angularly displaced sets of mandrels or core rods 54a–d (a and b not shown in FIG. 1) radially disposed therefrom. (Typically each such set may comprise from 1 to 15 individual core rods or mandrels with the blow molds and injection molds each having a corresponding number of cavities.)

Although not illustrated, the turret head may also have three, rather than four, equi-angularly displaced, radially projecting sets of core rods. In that case, the machine would have one rather than two idle work stations, i.e. stations where core rods are not enclosed by molds for one of the molding operations. Also, the work stations would be displaced 120°, rather than 90°, from adjacent work stations. Still other types of machines may have from three to six such work stations.

Turret head 52 is biased upwardly by a constant pressure piston (not shown) in plate frame structure 10 and moved downwardly by lever arm 58 with bearing surface 60 riding on bearing member 62 which is connected through shaft 64 to turret head 52. Lever arm 58 is pivotally mounted at one end 66 to plate frame structure 10 and at the other end 68 to an appendage 70 movable with movable blow mold half connecting means 20. A safety switch 72 signals when an overload occurs in the core rod lowering system.

Indexing of turret head 52 is accomplished when turret head 52 moves upward, and one of the slots 74a–d is engaged by flag member 76 attached to a lower crank arm 78 of the indexing mechanism 80, of the present invention, which is actuated by actuator 82, all of which is shown and described in more detail hereinafter. The convenience of engaging and disengaging turret head 52 and the indexing means of this invention, simply by the reciprocation of turret head 52 between two axially displaced limit positions, is an important feature of the present invention.

Figure 2:
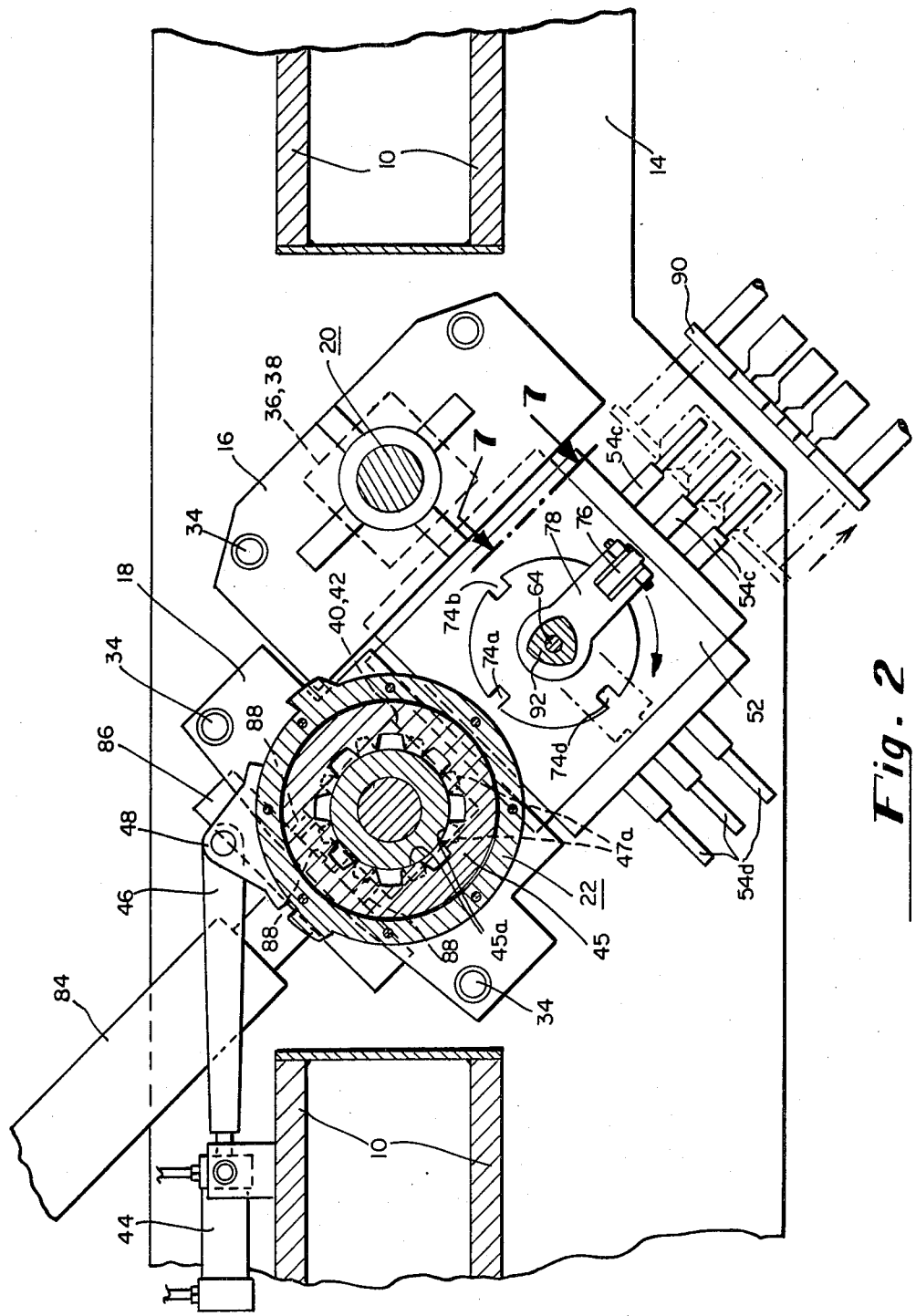
FIG. 2 is a plan view of the turret and work stations in the machine of FIG. 1.

Turning now to FIG. 2, which is a sectional plan view of the machine shown in FIG. 1 and in which like elements are numbered accordingly, there is seen hydraulic cylinder 44, which, acting through connecting members 46 and 48, imparts a slight rotational movement to a first interrupted spline member 45 after injection mold 40, 42 has been closed, thereby mating the inward projections 45a thereof with corresponding inward projections 47a of second interrupted spline member (not shown) associated with movable mold connecting means 22 and located below first interrupted spline member 45 when connecting means 22 and movable mold half 42 are in their lowered position. The function of these mating interrupted spline members is to transmit a resistance force, to an additional injection mold clamping force, through member 45 to frame structure 10. This additional injection mold clamping force, which is applied independently of piston 26 and yoke member 24, is imparted to movable injection mold half 42 by a separate hydraulic piston and cylinder combination, not shown, which is included in and integral with movable mold connecting means 22.

Further shown in FIG. 2 is a portion of a conventional plastification and injection means 84 terminating in melt manifold 86 having individual nozzles 88 mating with and feeding individual cavities in injection mold 40, 42. Conventional plastification and injection means 84 may comprise, for example, a feed hopper, a heated barrel, and a longitudinally movable extruder screw therein, the barrel terminating in a primary nozzle mating in a suitable recess of manifold 86.

Also seen in FIG. 2 is an ejector mechanism 90 for removing blown bottles from core rod set 54c.

Seen more clearly in FIG. 2 is lower crank arm 78, with flag member 76, and slots 74a, b, and d on turret head 52 for engaging flag member 76. Radial arm 78 is fixedly attached to indexing shaft 92 of indexing mechanism 80, freely movable through the center of which is turret head raising shaft 64.

Looking now to FIGS. 3–5, wherein the preferred embodiment of the indexing mechanism of this invention is shown in more detail, there is seen index mechanism housing 94 with internal support members 96 having guide slots 98 therein. Movable longitudinally in guide slots 98 are bearing members 100 connected by axle 102 retained by nuts 104, to one end (the driven end) of linear link member 106, which is also pivotally connected by axle 102 through adjustable sleeve 108 to a connecting rod 110 of a hydraulic piston housed in cylindrical housing 112.

At its opposite end (the driving end), linear link member 106 is pivotally connected by axle 114 and retainers 116 to an arcuately movable end 118 of upper crank arm 120 extending from hollow index mechanism shaft 92. As shown, upper crank arm 120 is in its first limit position, which is one terminus of a 90° indexing stroke.

Shown by phantom lines in FIGS. 3 and 4 is the second limit position of upper crank arm 120 and linear link member 106 at their second terminus. In this second limit position, the linear link member 106 is substantially perpendicular to upper crank arm 120, which is also substantially parallel to the linear path through which the driven end of linear link member 106 is driven.

Generally, the first limit position must be angularly displaced less than 180° from the second limit position. Preferably, however, this angular displacement is less than 120° and most preferably it is either 90° for a four station machine or 120° for a three station machine.

Preferably also, linear link member 106 is approximately the same length as crank arm 120. This relationship results in a compact mechanism which nevertheless provide an effective force transfer with all of the characteristics inherent in the present invention.

In all cases, a compressive force is exerted on linear link member 106 to move upper crank arm 120 from its first limit position and toward its second limit position. In the preferred form of the present invention, this compressive force is provided by the hydraulic piston in housing 112, which also, by reverse actuation, returns the indexing mechanism to its starting position after the indexing stroke has been completed and turret head 52 disengaged. Inherently, this hydraulic actuation means is simple, reliable, fast and is characterized by smooth but rapid acceleration in the initial phase of its movement, thus avoiding undue loading of the apparatus due to the inertia of the turret head 52 at rest.

Indexing mechanism 80 is lubricated by lubricating fluid substantially filling housing 94. As seen in FIG. 5, seals 134 retain this lubricating fluid while permitting free radial movement of shaft 92 on roller bearings 136.

In FIG. 6, which is a sectional detail view of the adjustable sleeve 108 in the plane 6—6, there is shown the threaded projecting end 122 of connecting rod 110 with mating threaded connecting member 124 having a slot 126 and a tightening bolt 128. The longitudinal position of connecting rod 110 relative to connecting member 124 and linear link member 106 is adjustable through access hole 132 by means of a screw driver in slot 130 provided therefor after removal of tightening bolt 128 through an access hole (not shown) in the top of index mechanism housing 94.

In FIG. 7, which is an expanded side view of the outer end of lower crank arm 78 and flag member 76 an a part of turret head 52, partially cut away to show flag receiving slot 74c, it will be seen that flag member 76 is mounted to permit pivotal movement about an axis 138 perpendicular to its planar faces. As seen in FIG. 8, which is a sectional view in the plane 8—8 of FIG. 7, flag member 76 is retained in the position shown in FIG. 7 by ball detent and spring loaded ball mechanism 140. Wear plates 142 are provided to prevent frictional wear due to the rotation of flag member 76 in crank arm 78.

Rotation of flag member 76, into the position shown by phantom lines in FIG. 7, may be accomplished manually, using handle 142 provided for that purpose, or automatically by the striking of flag member 76 on a portion of turret head 52 other than slots 74a–d. The latter is a safety feature, preventing damage to the apparatus in the event of attempted engagement when flag member 76 is not aligned with one of the slots 74a–d.

The ability to rotate flag member 76 manually is important because in its rotated position, flag member 76 does not engage turret head 52. This facilitates machine set up by permitting turret head 52 to be indexed manually, thus ensuring proper clearances, etc.

A stop 144 is provided to limit the rotational movement of flag member 76.

From the foregoing discussion, it is evident that the indexing mechanism of the present invention may be utilized in conjunction with a wide variety of apparatus having turret elements. Any of numerous types of engagement and disengagement means may be used for unidirectional turret indexing, although a particularly convenient and useful feature of this invention, as shown and discussed above, is its suitability for engagement and disengagement by simple axial movement of the turret to be indexed.

With regard specifically to the operation of the apparatus illustrated in FIGS. 1–8, starting with the molds in their closed position, plastic material is injected by plastification and injection means 84 into injection mold cavities, defined by injection mold halves 40, 42, forming parisons or bottle preforms about the mandrels or core rods of set 54a. The molds are then opened by actuation of hydraulic piston 26 moving yoke member 24 and mold mounting members 16 and 18 in unison.

Turret head 52 is simultaneously raised one half the distance of the upward movement of the movable mold halves, the upward movement of lever arm 58 in unison with the mold opening mechanism actuated by hydraulic piston 26 permitting it to do so. Slot 74a is thereby engaged with flag 76, and indexed through 90° by indexing means 80 actuated from the position shown in FIGS. 4 and 5 by the piston attached to connecting rod 110. The molds and turret head 52 are then lowered (and the molds closed) by reversal of the mold opening movement previously described. Simultaneously indexing means 80 is disengaged and is returned to its starting position in readiness for the next indexing stroke. A second set of parisons are then formed on the next adjacent core rod set 54d while the parisons formed in the preceding cycle are blow formed into hollow bottles in blow mold cavities, defined by blow mold halves 36, 38, by the introduction of high pressure fluid, such as compressed air, through the core rods of set 54a. The mold is then opened and the cycle repeated with the blown bottles formed in the preceding cycle removed by ejector mechanism 90 while the second set of parisons is blown in the blow mold cavities and still another set of parisons are formed in the injection mold cavities. The cycle is then repeated indefinitely.

As will be understood by those skilled in the art, while the present invention has been described only with reference to its preferred embodiment, it is not limited thereto. Rather, numerous other embodiments and applications will be apparent to those skilled in the art and the appended claims are intended to cover all such modified forms of this invention which are within its true spirit and scope.

With regard to the injection blow machine shown and described herein, it should be noted that certain components thereof, which are minor and conventional, though necessary, have been omitted for the sake of clarity. These components include controls, heater elements, sensors, hydraulic, pneumatic and electrical circuits, etc.

What is claimed is:

1. Injection blow molding machine including a turret indexing means, said turret indexing means comprising:
   a. a crank arm pivotally mounted at its inner end on the axis of said turret for movement about said axis between first and second angularly displaced limit positions less than 180° apart;
   b. a linear link member having a driven end movable in a linear path approximately parallel to said crank arm at said second limit position and a driving end pivotally connected to the outer end of said crank arm, said linear link member and said crank arm being approximately perpendicular to one another at said second limit position, and
   c. driving means (1) for applying compressive force on said linear link member at the driven end thereof to move said crank arm away from said first limit position and toward said second limit position and (2) for returning said crank arm to said first position; said injection blow molding machine comprising:
   d. a turret with axial movement means to move said turret reciprocatively along its axis between first and second limit positions thereof, and at least three equiangularly displaced radially projecting sets of at least one core rod and means for selectively introducing fluid under pressure into the space surrounding at least one of said core rod sets,
   e. injection and blow molds, each consisting of stationery and movable mold halves with means to open and close said molds by movement of said movable mold halves in a direction parallel to, but of substantially greater distance than, said turret axial movement, said molds in their closed positions enclosing, respectively, adjacent core rod sets when said turret is at the first of its axial movement limit positions,
   f. means for injecting a plastic material into said injection mold when it is in its closed position,
   g. said turret indexing means further including means for engaging said turret and said turret indexing means when said molds are in their open position and said turret is at the second of its axial movement limit positions, and
   h. means for removing blown products from one of said core rod sets not enclosed by said injection and blow molds while said molds are in their closed position.

2. Injection blow molding machine, as recited in claim 1, wherein said first limit position of said crank arm is displaced up to 120° from said second limit position.

3. Injection blow molding machine, as recited in claim 1, wherein said first limit position of said crank arm is displaced 120° from said second limit position.

4. Injection blow molding machine, as recited in claim 1, wherein said first limit position of said crank arm is displaced 90° from said second limit position.

5. Injection blow molding machine, as recited in claim 1, wherein said driving means comprises a hydraulic piston.

6. Injection blow molding machine, as recited in claim 1, wherein said crank arm rotates about said turret axis in unison with a second crank arm having at its outer end a first engagement means for engaging said turret.

7. Injection blow molding machine, as recited in claim 6, wherein said first engagement means comprises a radially disposed flag member and said second engagement means comprises a plurality of receiving slots for said flag member, said slots having an angular displacement therebetween corresponding to the angle between said limit positions of said crank arm.

8. Injection blow molding machine, as recited in claim 7, wherein said flag member is pivotally mounted on said second crank arm to permit rotation of said flag member about an axis perpendicular to the planar faces thereof into a position wherein it does not engage said second engagement means.

9. Injection blow molding machine, as recited in claim 8, wherein said driving means comprises a hydraulic piston, and said crank arm limit positions are displaced 90°–120°.

10. Injection blow molding machine, as recited in claim 9, wherein said crank arm and said linear link member are of approximately equal length.

11. Injection blow molding machine, as recited in claim 9, further including sequencing means for repeatedly producing the following sequence of events,
   a. turret moves toward and engages said indexing means, while movable mold halves move in unison therewith to open said injection and blow molds,
   b. driving means moves said crank arm to said second limit position,
   c. turret moves away from and disengages said indexing means, while movable mold halves move in unison therewith to close said injection and blow molds,
   d. indexing means returns crank arm to said first limit position,
   e. plastic is injected into said injection molds, compressed fluid is released into the space surrounding said core rod set enclosed by said blow molds, and bottles are removed from one of said core rod sets not enclosed by said injection and blow molds.

* * * * *